Dec. 20, 1966   G. A. RUBISSOW   3,292,982
SHEET FILE, WHOSE SHEETS ARE VERTICALLY SUSPENDED
Filed Dec. 17, 1962   4 Sheets-Sheet 1
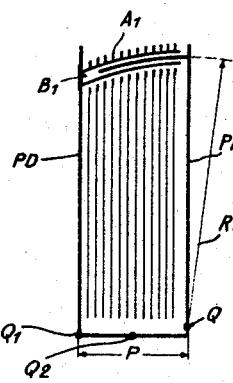
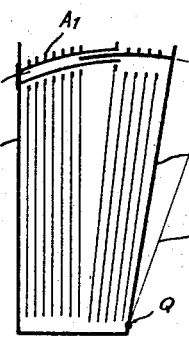
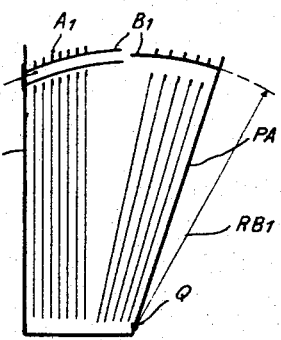
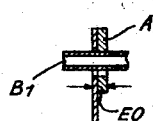
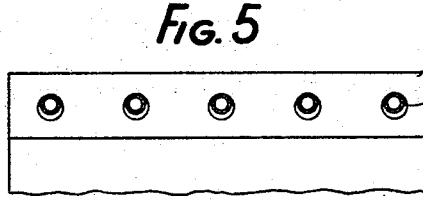
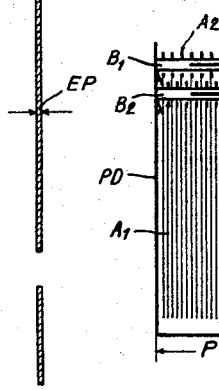
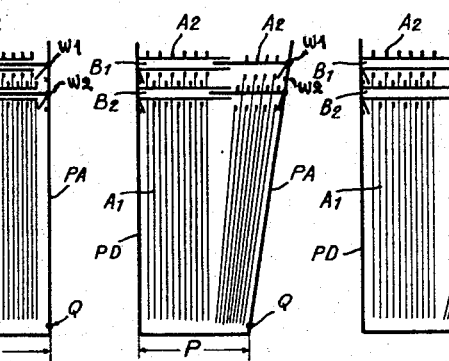
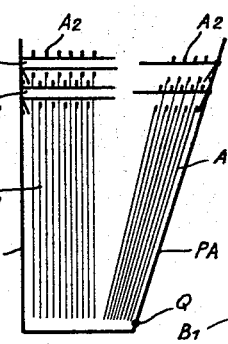
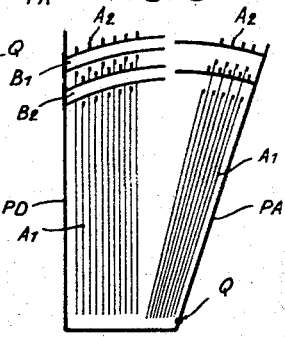
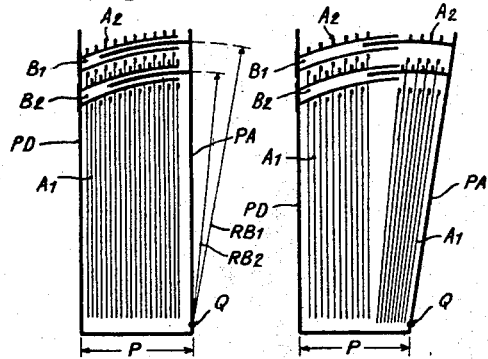
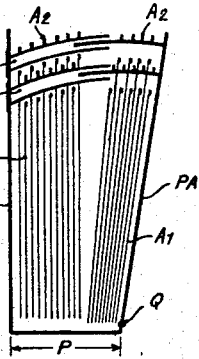
INVENTOR
George A. Rubissow Dec. 20, 1966   G. A. RUBISSOW   3,292,982
SHEET FILE, WHOSE SHEETS ARE VERTICALLY SUSPENDED
Filed Dec. 17, 1962   4 Sheets-Sheet 2
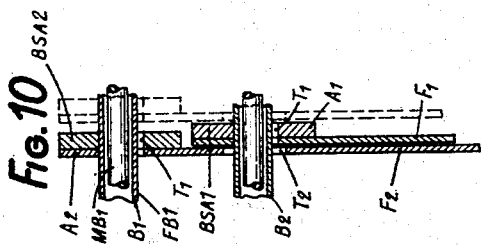
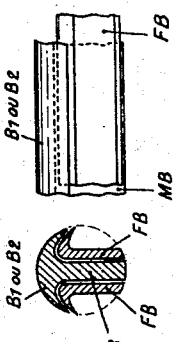
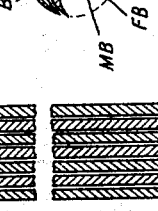
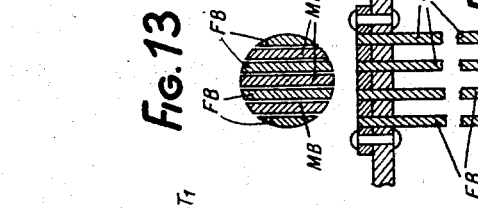
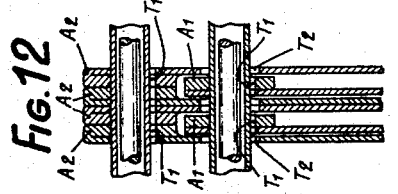
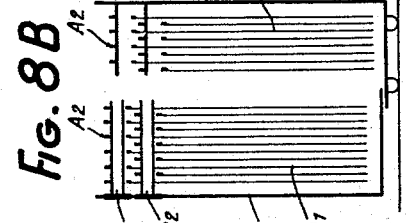
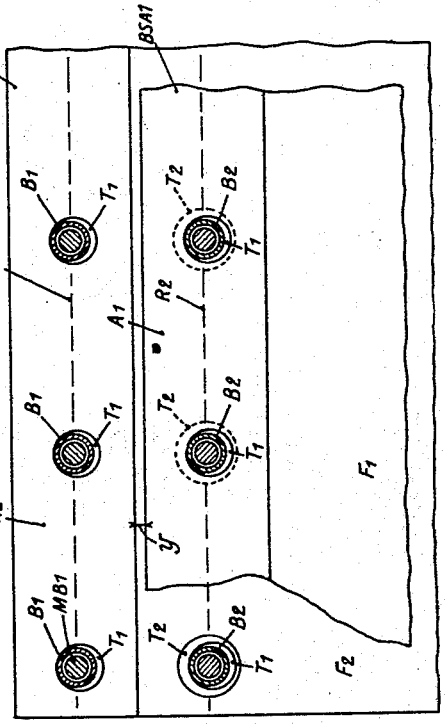
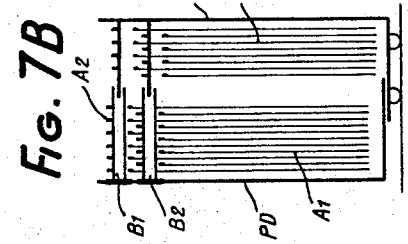
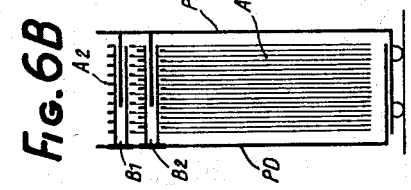
INVENTOR
George A. Rubissow

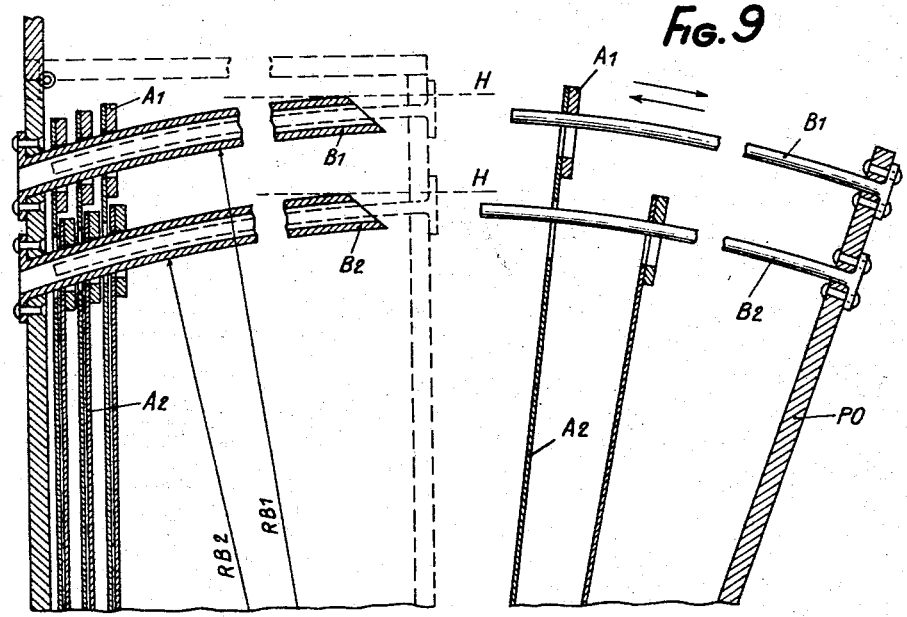
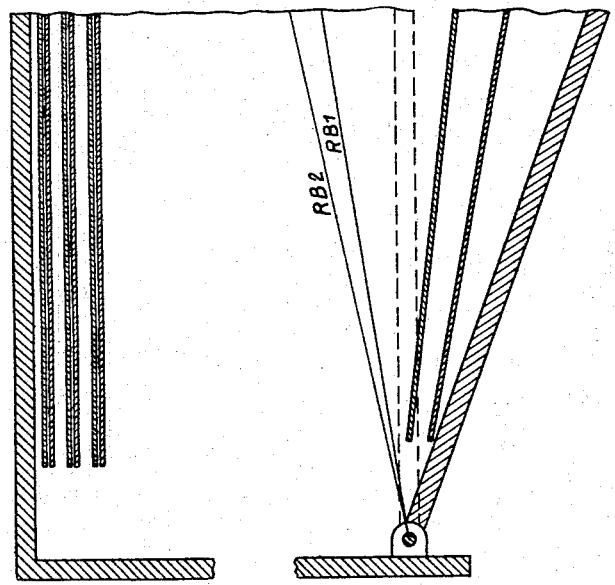

Dec. 20, 1966 G. A. RUBISSOW 3,292,982
SHEET FILE, WHOSE SHEETS ARE VERTICALLY SUSPENDED
Filed Dec. 17, 1962 4 Sheets-Sheet 4
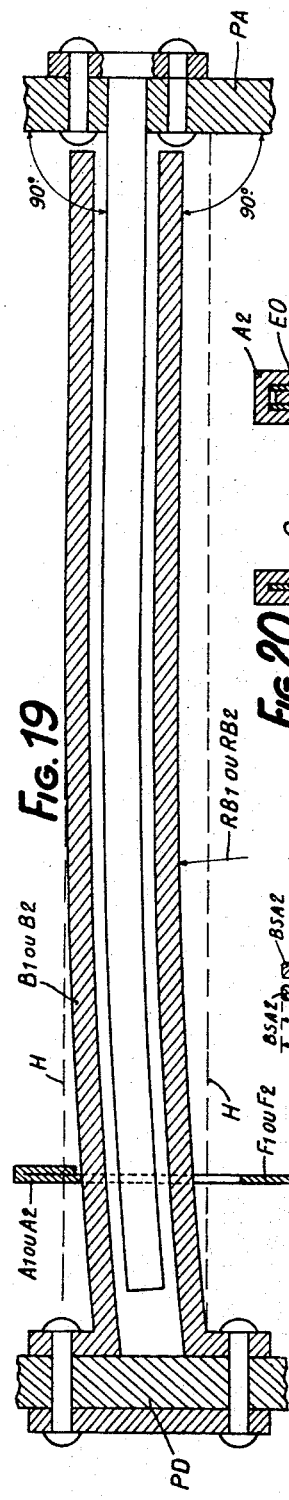
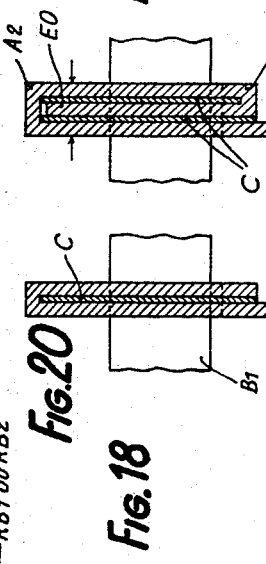
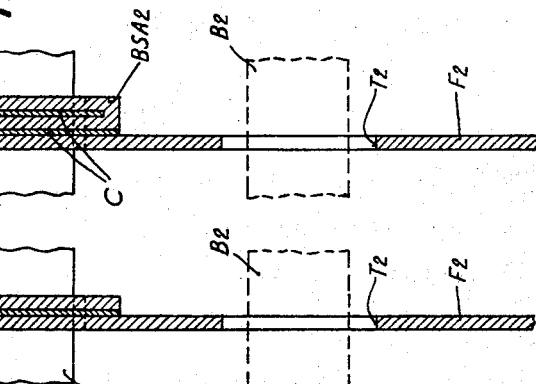
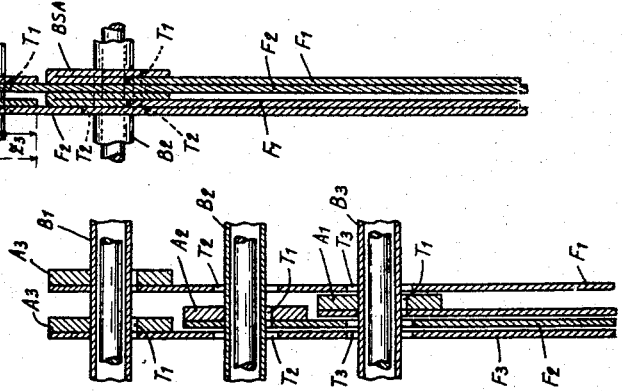
INVENTOR
George A. Rubissow United States Patent Office 3,292,982
Patented Dec. 20, 1966

3,292,982
SHEET FILE, WHOSE SHEETS ARE VERTICALLY SUSPENDED
George A. Rubissow, 420 Riverside Drive, New York, N.Y. 10025
Filed Dec. 17, 1962, Ser. No. 246,301
6 Claims. (Cl. 312—184)

This invention refers to a sheet file whose sheets are vertically suspended. Such sheets may be for instance plans, documents, cards, papers.

FIGURES 1, 2 and 3 represent diagrammatically a side-view in cross-section of a known file having one horizontal row of supporting arms.

FIGURE 4 represents a cross-sectional side-view of a suspension sheet.

FIGURE 5 is a plan-view of FIGURE 4.

FIGURES 6, 7 and 8, 6A, 7A, and 8A, 6B, 7B, and 8B, represent diagrammatically side-views in cross-section of a file with two rows of supporting-arms.

FIGURE 9 represents in cross-section a side-view of a file with two rows of supporting-arms.

FIGURE 10 represents a cross-sectional side-view of FIG. 9.

FIGURE 11 is a plan-view of FIGURE 10.

FIGURE 12 represents a cross-sectional side-view of another arrangement of the sheets.

FIGURE 13 represents a cross-section view of supporting-arms.

FIGURE 14 represents a cross-sectional top-view of FIGURE 13.

FIGURE 15 represents another embodiment of the supporting-arms in a cross-sectional side-view.

FIGURE 16 is a side-view of FIGURE 15.

FIGURE 17 represents in a cross sectional side view a system using simultaneously three different types of supporting strips.

FIGURE 18 represents a cross-sectional side-view of another system of supporting strips.

FIGURE 19 represents, in almost natural size, a side-view, partly in cross-section, of a circular supporting-arm.

FIGURES 20 and 21 represent in cross-sectional side-views other embodiments of supporting strips.

All figures represent a vertical file for vertical suspension of sheets such as for instance plans, tracings, documents, drawings and the like.

FIGURE 1 represents a file of a known type in its closed position with a number $n$ of sheets of plans vertically suspended on a single horizontal row, of telescopic circular supporting-arms B1. The sheets suspended are provided with suspension strips or edges made of cardboard, or other reinforcing means and perforated with a number $m$ of holes or cut-outs to fit the telescopic supporting-arms. In FIGURES 1, 2 and 3, only 12 suspended sheets are diagrammatically shown.

Although these circular supporting-arms B1 are not horizontal because of their curvature, it can nevertheless be considered that their working is as efficient as that of the horizontal supporting-arms.

FIGURE 19 represents, by way of example and non limitedly, the sheets suspended on such a circular supporting-arm (only one sheet is shown).

When the back stationary panel PD is disassociated from the movable opening front panel PA, the male supporting-arms will be disassociated from the female supporting-arms, as shown in FIG. 3, and the sheets may then be put-in or removed from these supporting-arms, i.e. from this file.

FIGURES 6, 7, 8 and 9 represent a vertical file, subject of this invention, which, at first sight, seems similar to FIGURES 1, 2 and 3, but which, in reality, is entirely different since, in lieu of a single and unique row of circular telescopic supporting-arms B1, it uses at least two rows of such supporting-arms B1 and B2, each of which (supporting-arms) being circular and telescopic, and the two rows being preferably parallel one to the other. For this embodiment it is necessary to use, in addition to the single type of sheets A1, as illustrated in FIGURES 1 to 5, at the same time, a special type of sheets A2 as illustrated in FIGS. 6 to 9 inclusive. These sheets A2 and A1 are illustrated in FIGS. 10 and 11. Each sheet of the type A2 is provided with two rows R1 and R2 respectively provided with holes T1 and T2. Thus, only the external (upper) row R1 of the holes T1 bears the sheets A2 thus suspended on the supporting-arms B1, FIGS. 11, 12, 13, 14, 15, 16, 19 and 20, while the second row R2 of holes T2 is additionally provided in the sheets A2. These holes T2 have a diameter larger than the diameter of the supporting-arms B2, and are perforated at such a distance of B1 that the edges of the holes T2, do not touch the supporting-arms B2, which thus do not bear the sheet A2, as illustrated on FIGS. 10 and 11. The sheets A1 are suspended only on the second row R2 (lower row) on the holes T1 provided on their supporting strip BSA1 and corresponding to the supporting-arms B2.

In conformity with the main subject of this invention, the suspension strip BSA2 should not touch or overlap or cover the suspension strip BSA1, and for this purpose there is provided a small clearance Y between the lower edge of BSA2 and the upper edge of BSA1.

As an example, but not limitedly thereto, there may be provided for the sheets A2 and A1 supporting strips BSA2-BSA1 of a width of 60 mm. and a clearance Y of 1 mm. to 5 mm., even 10 mm. The diameter of these supporting-arms B1 and B2 may be of 25 mm., the length of sheets of 1000 mm. or 1500 mm.; the suspension holes T1 for A2 and A1 of 28 mm., and the clearance holes T2 of 33 mm. This will permit a very practical arrangement. The number $m$ of the supporting-arms will depend on the weight of the sheets, and thus on the thickness of the sheets A2 and A1. As an example non-limitative, 2 to 7 supporting-arms in each row could be used, as illustrated in FIGURE 11; all the sheets A2 and A1 could be numbered consecutively, one after the other 1, 2, 3, 4, and so on where the odd numbers will be of the type A2 and the even numbers of the type A1.

Considering that in practice a common file having its operative depth of $P=500$ mm. FIGS. 1, 6 and 6A, and the operative thickness EO, FIG. 4, of the sheet having a thickness $EP=0.5$ mm., 600 to 700 sheets can be placed, with a slight clearance left between the suspension strips of these sheets; according to this invention, in this example, a double number of those sheets i.e. 1200 to 1400 will be easily nested together provided such sheets will be of the two different types A2 and A1 subject of this invention.

The two types of sheets A2 and A1 could also be lodged, as illustrated in FIG. 12, where A2 is first followed by A1 and then by A2 turned back with its supporting strip towards the suspension strip of A1. In this way, one A1 could be placed between two A2, and thus the numbering will in this case be for A2 (No. 1), A1 (No. 2), A2 (No. 3 turned back), A2 (No. 4), A1 (No. 5), A2 (No. 6 turned back), and so on.

In FIGURES 10 and 11, are illustrated the respective positions of the sheets A2 and A1, which provides for the use of two different types of sheets A2 and A1 to be suspended upon two rows B1 and B2 of supporting-arms. This arrangement will give a file which could lodge, as for example and not limitedly, 50% to 95% more sheets for the same operative depth P, FIGS. 1 and 6. If, for instance P=50 cm. and if the thickness of the sheet A1, FIGS. 4, 1, 2 and 3, and of the sheet A2, FIGS. 6, 7, 8, 9, 10, is 0.15 mm., and the thickness of the strips is of 0.35 mm., the result will then be $$EO = 0.15 + 0.35 = 0.5 \text{ mm.}$$

which will thus be the operative thickness EO of the sheets A2 and A1. By placing them on one single row of supporting-arms, FIGS. 1, 2 and 3, the result will theoretically be for a depth P=50 cm.=500 mm. 1000 sheets.

Due to this invention, a file having the same thickness of P=500 mm. but having instead of one single row of supporting arms, two rows B1 and B2, by using the two types of sheets A2 and A1 in the consecutive order A2, A1, A2, A1, etc., will easily suspend theoretically about 1540 sheets instead of 1000 sheets, thus about 54% more.

In practice, these figures 1000 and 1540 sheets are slightly proportionally reduced taking into account the necessary clearance to be provided between the suspension strips and sheets in question, but the gain of about 54% will always be maintained for the given example given of P=500 mm.; EO=0.5 mm.; EP=0.15 mm. in favour of the file subject of this invention.

This invention does not refer to any file which is using one single row of any type of supporting telescopic arms, either circular, or having a form of a straight line or pivoting individually which type of arms is shown in FIGS. 1, 2, and 3 for circular arms, and in FIGS. 6B and 6A for the other types of arms.

Contrary to this, this invention refers to a file which uses simultaneously two rows of supporting arms B2 and B1, spaced one from the other and parallel one to the other, and additionally at the same time uses two different types of sheets A2 and A1, each provided with different supporting strips BSA2 and BSA1. In FIGS. 6, 7 and 8 are shown two rows of circular telescopic arms the movable male parts of which are for example affixed to the pivoting openable section of the file. In FIGS. 6B, 7B and 8B are shown two rows of telescopic arms having the form of a straight line while the file itself has an openable movable section which is mounted on rolers provided on its bottom and thus could be moved to and fro in respect to its stationary back section as shown in FIG. 8B.

The two rows of straight-line supporting-arms B1 and B2, shown in FIGS. 6B, 7B and 8B, do not individually pivot, each of their telescopic parts being integrally affixed at one of its ends to the panels PA and PD.

When two rows of hereinbefore described supporting-arms B1 and B2 are used in any system of file cards, even in one having straight supporting-arms as for instance the file system in FIGS. 6A, 7A and 8A, such system being equally subject of this invention.

The supporting strips BSA2 and BSA1 may be made in different forms and in different dimensions.

To economize the total operative thickness EO (of the supporting strips and of the sheets affixed thereto), a suspension strip such as shown in FIGS. 18 and 19, may be used, where the thickness of the strips BSA2 and BSA1 but not the operative thickness EO have the same thickness (as an example and non limitatively), as that of the sheets F1 and F2. The strip is obtained by folding the top of the sheet.

In conformity with this invention, the cardboard for the supporting strip, may be finished with a coat of varnish or paint, which will thus constitute the supporting strip. The varnish or paint may be, for instance, a plastic varnish or DUCO, latex, nylon paints, cellulosic varnishes and any other suitable material. The edge of the sheet may simply be folded to thus constitute the suspension strip, as this is shown in FIGS. 18 and 19. Varnish, paint, or glue, etc. C, may be introduced between the folded parts of the sheet to constitute a reinforced supporting strip. This supporting strip may also be made of very thin plastic or metallised plastic, or a very thin sheet of metal, or an aluminium foil thin enough, glued upon the sheets F2 and F1. The supporting strip could be produced by impregnation of the upper portion of the sheets with an impregnation product.

The supporting-arms are made of two parts: male part MB and female part FB, and these parts may be of any suitable form, for instance, tubes FB1 and MB1, FIGS. 10, 11, or made of strips of curved profiles, such as shown in FIGS. 13, 14, 15 and 16. Each of the external parts of each of the male and female supporting-arm is fixed rigidly to the respective walls of the back stationary panel and of the movable opening front panel of the file by well-known means, nuts, bolts, soldering, etc.

FIGURE 17 shows a file having three rows R1, R2 and R3 of supporting-arms B1, B2 and B3, thus serving at the same time three different types of sheets A3, A2 and A1— A3 having three rows of holes, A2 having two rows of holes, and A1 having one row of holes. The sheet A3 is provided with the row R1 of holes T1 and rows R2 and R3 of holes T2. A2 and A1 are identical with the type previously described.

What I claim is:

1. A vertical file for classification by vertical suspension of two different types of sheets, an upper sheet and a lower sheet, comprising a known movable front openable section and a stationary back section, the upper parts of said sections being provided with two mutually parallel series of telescopic supporting arms, and upper series and a lower series, each of said supporting arms having a male and a female member respectively attached by one of its ends to one of said upper parts, each of said lower sheets having attached on its upper portion a first supporting strip provided with a row of holes, corresponding to said lower series of supporting arms for engagement thereover, each of said upper sheets having attached on its upper portion another supporting strip provided with an upper row of holes corresponding to said upper series of supporting arms for engagement over them, the upper portion of said upper sheet which is adjacent to said other supporting strip having a lower row of holes corresponding to said lower series of supporting arms which thus pass freely through them, due to the non-overlapping of said supporting strips, a clearance having the form of a straight line is provided which extends between the upper edge of said lower supporting strip and the lower edge of said upper supporting strip.

2. A vertical file for classification by vertical suspension of two different types of sheets, an upper sheet and a lower sheet, comprising a known movable front openable section and a stationary back section, the upper parts of said sections being provided with two mutually parallel series of telescopic supporting arms, an upper series and a lower series, each of said supporting arms having a male and a female member respectively attached by one of its ends to one of said upper parts, each of said lower sheets having attached on its upper portion a first supporting strip provided with a row of holes, corresponding to said lower series of supporting arms for engagement therover, each of said upper sheets having on its upper portion and attached to it upper sheets having attached on its upper portion another supporting strip provided with an upper row of holes for engagement over them, the upper portion of said upper sheet which is adjacent to said other supporting strip having a lower row of holes corresponding to said lower series of supporting arms which thus pass freely through them, due to the non-overlapping of said supporting strips, a clearance having the form of a straight line is provided which extends between the upper edge of said lower supporting strip and the lower edge of said upper supporting strip, said movable front openable section being mounted on a pivot means provided therefor between said openable section and said back section, said supporting arms seen in side view are in the form of a chord of a circle having its center at the pivotal axis of said pivot means.

3. A file as set forth in claim 1 wherein a roller arrangement is provided at the bottom of said movable front openable section for facilitating its to and fro movements relative to said back section.

4. A vertical file as set forth in claim 1 in which the diameter of the holes of said upper and lower rows of holes in said supporting strips is at least equal to the diameter of said supporting arms, and the diameter of said holes provided in said upper portion of said upper sheets is substantially larger than the diameter of said lower series of supporting arms.

5. A vertical file as set forth in claim 2 wherein said circle has a radius which is larger then the distance between one of said rows of holes and the lower free edge of said sheets when they are suspended from said supporting arms.

6. A vertical file as set forth in claim 2 wherein the ends of said supporting arms which are secured to said movable front openable section are at the place where they are so secured perpendicular to the vertical plane of said openable section.

References Cited by the Examiner

UNITED STATES PATENTS

| | | | |
|---|---|---|---|
| 727,881 | 5/1903 | Beckbissinger | 312—184 |
| 916,565 | 3/1909 | Kurtz | 129—3 |
| 1,335,415 | 3/1920 | Adams | 312—184 |
| 1,827,638 | 10/1931 | Bingham | 120—1 |
| 2,111,932 | 3/1938 | Kennedy | 129—3 |
| 2,205,903 | 6/1940 | Mobus | 312—184 |
| 2,711,941 | 6/1955 | Mobus | 312—184 |

FOREIGN PATENTS

| | | |
|---|---|---|
| 1,082,992 | 6/1954 | France. |
| 93,368 | 8/1897 | Germany. |
| 580,538 | 7/1933 | Germany. |
| 205,122 | 8/1939 | Switzerland. |

CLAUDE A. LE ROY, *Primary Examiner.*

FRANK B. SHERRY, *Examiner.*

A. FRANKEL, *Assistant Examiner.*